(12) United States Patent
Staub

(10) Patent No.: US 7,871,090 B2
(45) Date of Patent: Jan. 18, 2011

(54) POWDER SPRAY COATING CART

(75) Inventor: Thomas Staub, Gossau (CH)

(73) Assignee: ITW Gema GmbH, St. Gallen (CH)

( * ) Notice: Subject to any disclaimer, the term of this patent is extended or adjusted under 35 U.S.C. 154(b) by 270 days.

(21) Appl. No.: 11/910,079

(22) PCT Filed: Apr. 7, 2006

(86) PCT No.: PCT/IB2006/000813

§ 371 (c)(1),
(2), (4) Date: Sep. 28, 2007

(87) PCT Pub. No.: WO2006/109126

PCT Pub. Date: Oct. 19, 2006

(65) Prior Publication Data

US 2008/0191437 A1 Aug. 14, 2008

(30) Foreign Application Priority Data

Apr. 9, 2005 (DE) .................. 10 2005 016 352

(51) Int. Cl.
*B62B 1/18* (2006.01)
(52) U.S. Cl. .................. 280/79.5; 280/47.35; 406/134; 406/39
(58) Field of Classification Search ....... 280/79.5–79.7, 280/47.34–47.371; 406/39, 134
See application file for complete search history.

(56) References Cited

U.S. PATENT DOCUMENTS

| | | | | |
|---|---|---|---|---|
| 2,673,671 A | * | 3/1954 | Williams | 224/555 |
| 3,239,147 A | * | 3/1966 | Sweet | 239/150 |
| 3,940,065 A | * | 2/1976 | Ware et al. | 239/146 |
| 4,588,318 A | * | 5/1986 | O'Brien et al. | 401/146 |
| 5,443,211 A | | 8/1995 | Young et al. | |
| 5,518,344 A | | 5/1996 | Miller et al. | |
| 5,641,170 A | * | 6/1997 | Helm | 280/30 |
| 6,279,838 B1 | * | 8/2001 | Sivells et al. | 239/146 |
| 6,497,423 B1 | * | 12/2002 | Perelli et al. | 280/47.34 |
| 2004/0050877 A1 | * | 3/2004 | Ono | 222/399 |
| 2004/0051266 A1 | | 3/2004 | Morrison et al. | |
| 2007/0057097 A1 | * | 3/2007 | Harutyunyan et al. | 239/654 |

FOREIGN PATENT DOCUMENTS

| | | |
|---|---|---|
| CN | 85204498 U | 11/1986 |
| DE | 103 37 226 A1 | 3/2005 |
| TW | 278066 | 6/1996 |

OTHER PUBLICATIONS

International Search Report mailed Oct. 5, 2006 for PCT/IB2006/000813.
Journal of Finishing Technology.
Journal of Industrial Coating, No. 192, The Industrial Coating Z17-909, (192) Jan. 2005.
Brochure of Electrostatic Coating Machine.

\* cited by examiner

*Primary Examiner*—J. Allen Shriver, II
*Assistant Examiner*—Erez Gurari
(74) *Attorney, Agent, or Firm*—Lowe, Hauptman, Ham & Berner, LLP

(57) ABSTRACT

A powder spraycoating cart comprising two lateral posts fitted at their upper ends with a grip system and connected to each other by a control implement bin, said posts being connected at their lower ends by a base designed to support any one of several different powder containers.

33 Claims, 5 Drawing Sheets

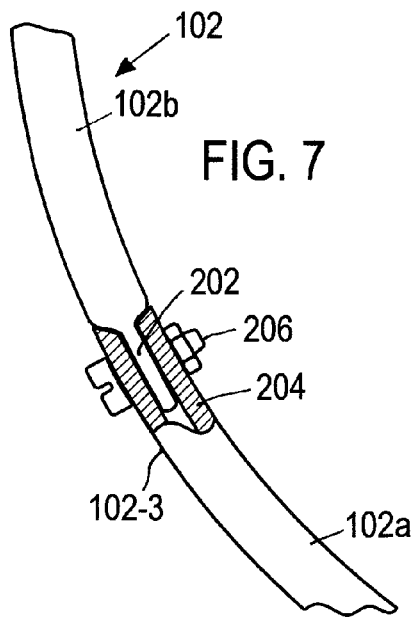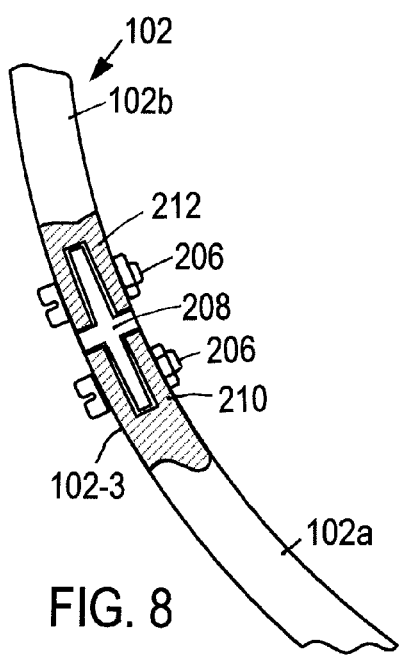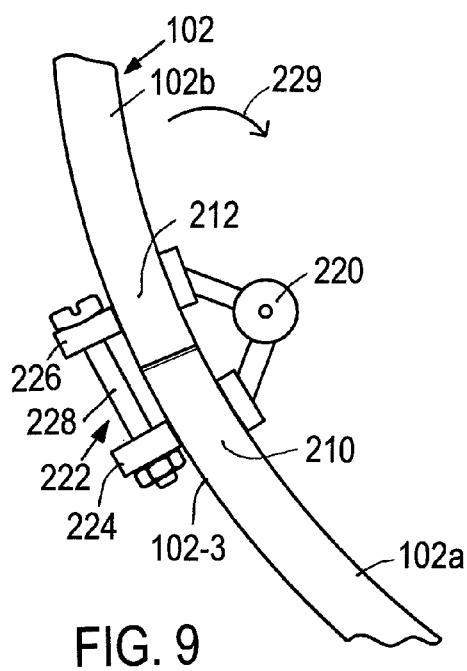

US 7,871,090 B2

POWDER SPRAY COATING CART

RELATED APPLICATIONS

The present application is based on International Application No. PCT/IB2006/000813 filed Apr. 7, 2006, and claims priority from German Application Number 10 2005 016 352.1 filed Apr. 9, 2005, the disclosures of which are hereby incorporated by reference herein in their entirety.

The present invention relates to a powder spraycoating cart as defined in the preamble of claim 1.

This cart may be manually pushed or drawn and preferably is fitted with three, especially with four wheels. It may also be a kind of luggage cart comprising only two wheels at the rear.

A powder container may be configured on this cart so that powder may be aspirated from it by means of an injector and be conveyed pneumatically to a spray gun. A pneumatically conveying powder injector preferably shall also be affixed to the cart, though in other embodiment modes said injector is affixed to the powder container. An electronic control unit that may be affixed to the cart is used to control flows of compressed air to the injector, and, in the event the spray gun is fitted with compressed-air ducts, also to this spray gun. The control unit also is able to adjust the high voltage if the spray gun is fitted with a high voltage electrode electrostatically charging the coating powder.

The objective of the present invention is optimization of the powder spraycoating cart.

Moreover the powder spraycoating cart of the present invention shall be manufactured economically and its weight shall be minimized.

The goals of the present invention are attained by the features of claim 1.

Further features are defined in the dependent claims.

The invention is elucidated below in relation to illustrative embodiment modes shown in the appended drawings.

Figure 1:
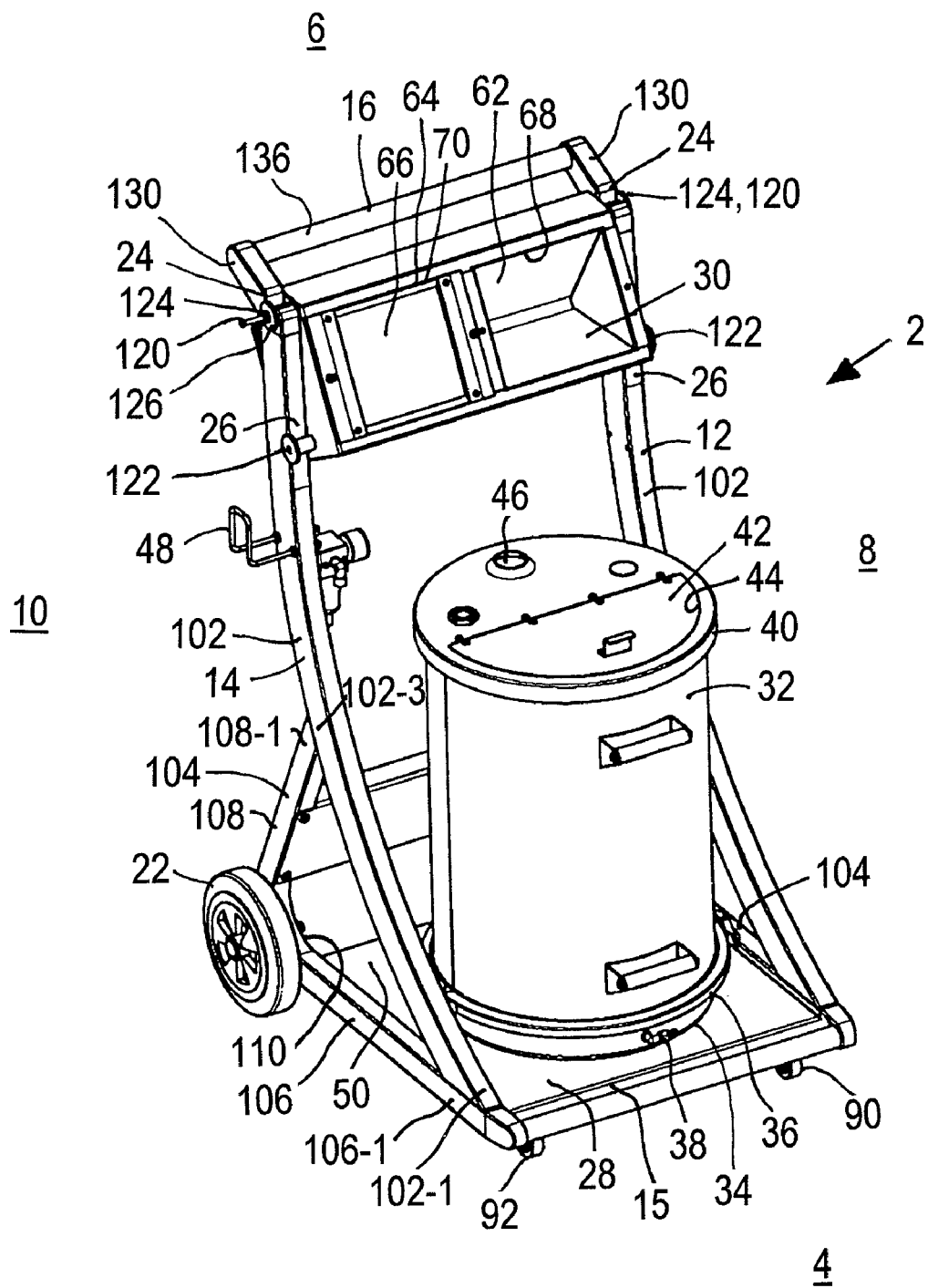
Figure 2:
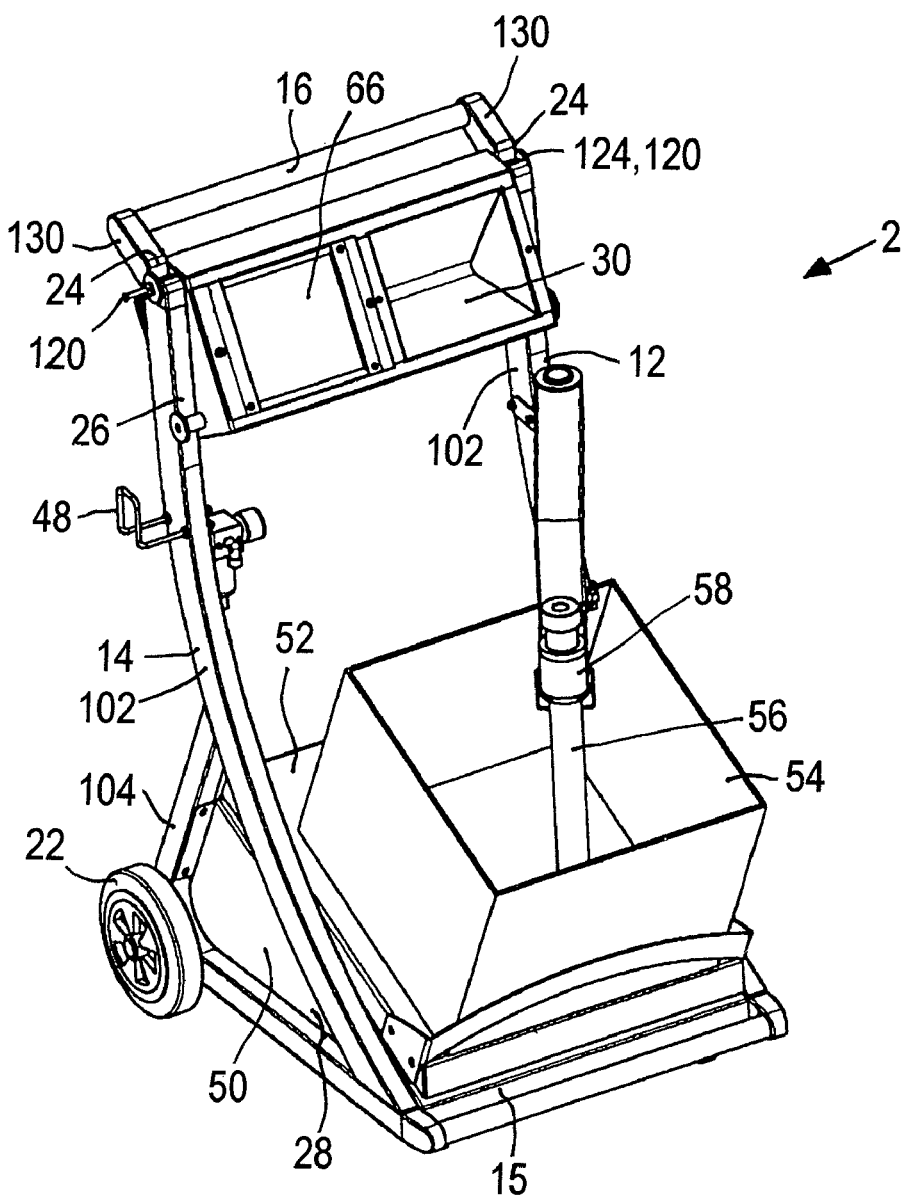
Figure 3:
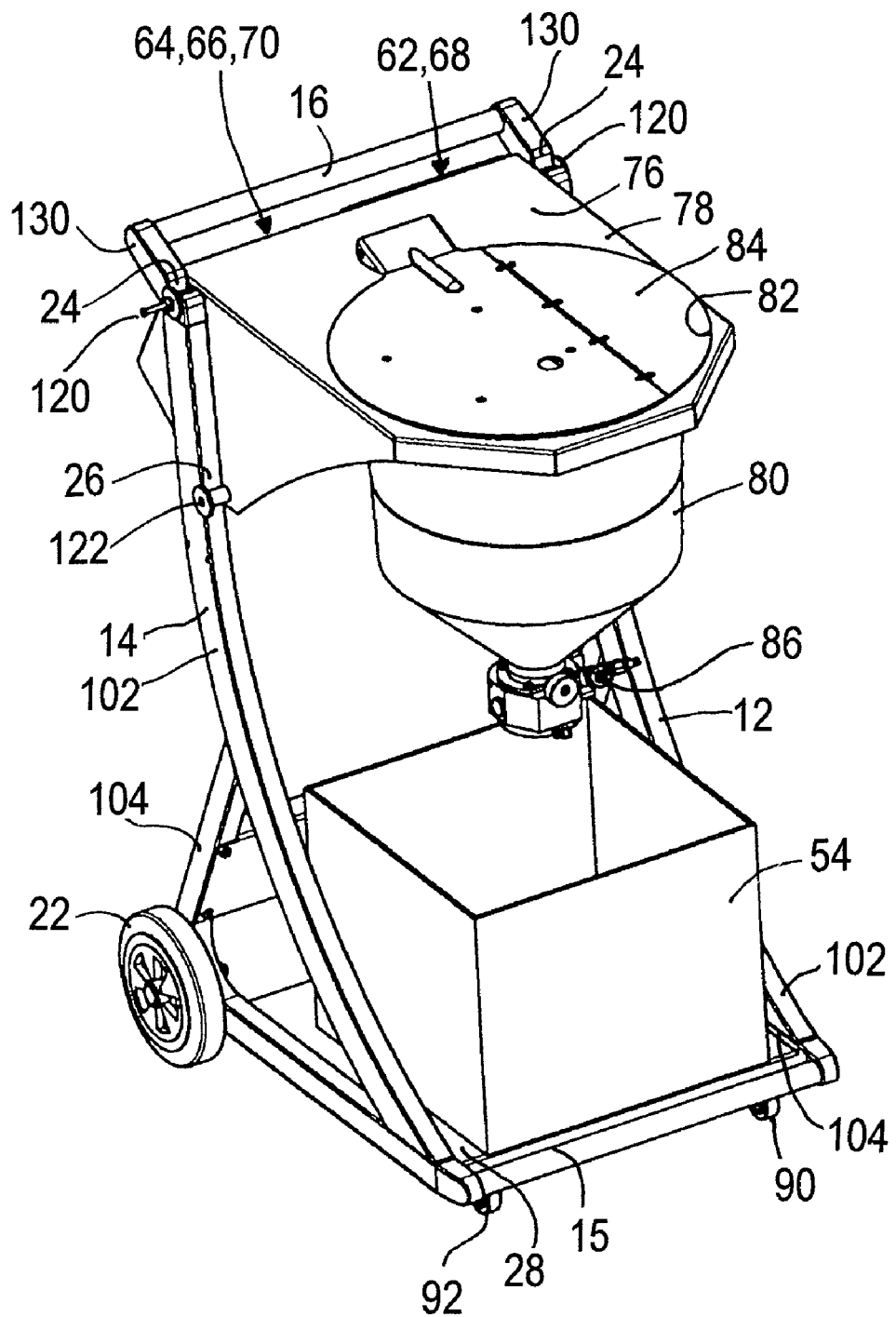
Figure 4:
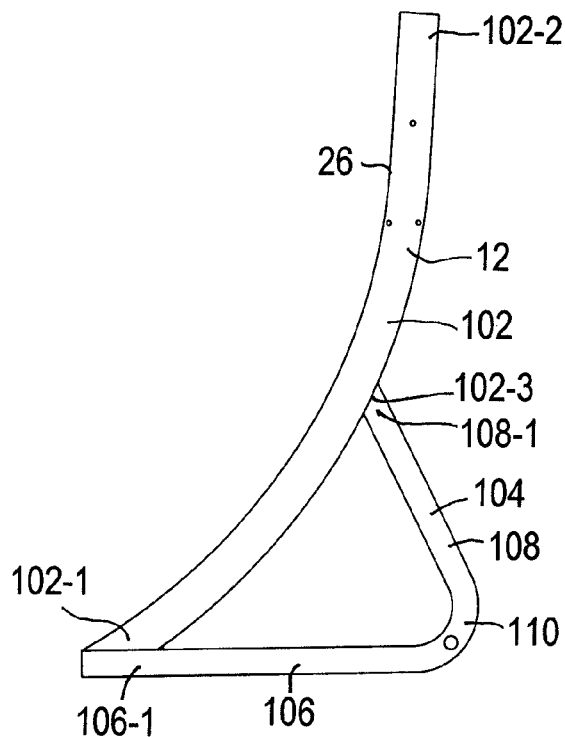
Figure 5:
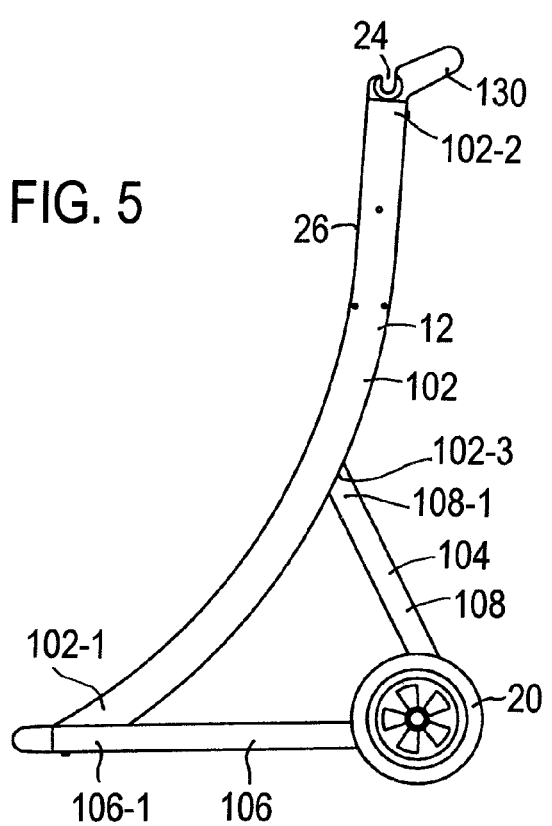
Figure 6:
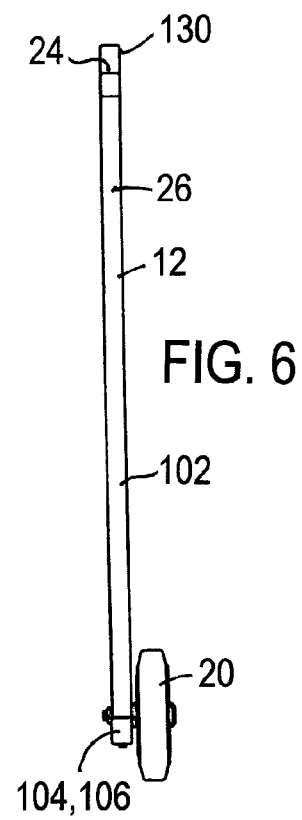

FIG. 1 is a perspective of a powder spraycoating cart of the invention,

FIG. 2 is a perspective of a further embodiment mode of a powder spraycoating cart of the invention, FIG. 3 is still another illustrative embodiment mode of a powder spraycoating cart of the invention, FIG. 4 shows a lateral post of the powder spraycoating cart of the invention, FIG. 5 shows the lateral post of FIG. 4 with wheel added and with added spacer for a gripper bar, FIG. 6 is a frontview of the lateral post of FIG. 5, and FIGS. 7, 8, 9 are cutaways of three further variations of the powder spraycoating cart of the invention.

The power spraycoating cart 2 of FIGS. 1, 2 and 3 are identical except being fitted with different accessory elements depending on their applications. Accordingly the discussion of the powder spraycoating cart 2 of FIG. 1 also applies to the carts 2 in FIGS. 2 and 3. Their details are shown in FIGS. 4, 5 and 6.

The powder spraycoating cart 2 comprises a front side 4, a back side 6, a left side 8 and a right side 10.

The powder spraycoating cart 2 comprises two preferably identical lateral posts 12 and 14 respectively configured on the left side 8 and on the right side 10. A base 15 connects the lateral posts 12 and 14 at their lower ends to each other and keeps them spaced apart. A grip 16 is mounted at the back side 6 at a standing adult's typical gripping height and connects to each other the two lateral posts 12 and 14 at their upper ends. Two wheels 20 and 22 configured axially apart on a common theoretical axis of rotation are mounted in rotatable manner at the cart's rear end respectively on the outside of the lateral posts 12 and 14.

Each of the upper end zones of the two lateral posts 12 and 14 is fitted with a suspension element 24, 26 to bilaterally suspend a control-implement bin 30 from, and to position it between, the two lateral posts 12 and 14.

The base 15 constitutes a platform 28 to alternatively receive one or more different powder containers or a powder container sub-structure on which this container may be set down. Illustratively FIG. 1 shows a powder container 32 which stands on the base 15 and which comprises a conventional double bottom 36 of which the outer (lower) bottom 34 is airtight and the inner (upper) bottom 36 is air permeable, for instance being perforated, whereby compressed air from a compressed-air fitting 38 can flow through the permeable inner bottom into the container inside and loosen the powder therein, in particular fluidizing it (i.e. suspending it). A cover 40 of the powder container 32 is fitted with an aperture 44 that can be closed by a flap 42 to fill the powder container with powder and an outlet aperture 46 passing as needed a suction tube together with an injector into the powder container 32 to aspirate coating powder and to pneumatically move this coating powder to an omitted spray gun for the purpose of coating objects with said coating powder.

Preferably a support 48 to hang up the spray gun when not in use is affixed to one of the two lateral posts 12 or 14, for instance at the post 14.

FIG. 2 shows the powder spraycoating cart 2 of FIG. 1 fitted with a powder container substructure 50 resting on the platform 28 of the base 15. At its top side, the sub-structure 50 comprises an oblique rest surface 52 on which the powder container 54 may be deposited in at a corresponding oblique position to allow the coating powder to slip toward one container wall or into one container corner for the purpose of more thoroughly removing powder residues from the powder container.

FIG. 2 shows a powder evacuation pipe 56 which is fitted at its upper end with a powder conveying injector 58 and which is affixed to the powder spraycoating cart 2, for instance at its left lateral post 12. The sub-structure 50 may be fitted with a vibrator to apply vibrational displacements to the rest surface 52 to enhance the desired slippage of coating powder in the powder container 54.

FIG. 3 again shows the powder spraycoating cart 2 of FIGS. 1 and 2, the powder container 54 resting essentially horizontally on the platform 28 of the base 15.

The control implement bin 30 of FIGS. 1 and 2 is fitted with two adjoining compartments 62 and 64 receiving as needed each one an electronic control unit 66 controlling the operation of at least one spray gun. The expression "spraygun operation control" in particular denotes controlling at least one flow of compressed air to one injector aspirating coating powder out of the powder container 32 or 54 and feeding it as a flow of compressed air to the spray gun. Spraygun operation control also may include control of compressed air to the spraygun and/or controlling the high voltage at the spraygun when latter includes such a feature.

Control is carried out preferably as a function of predetermined parameters and/or as a function of at least one coating program.

The ability to house two control implements 66 in the control implement bin 30 in turn allows feeding coating powder from the powder coating to two sprayguns in mutually independent manner. If the spraygun is not tribo-electric, but instead is fitted with one or more high voltage electrodes, then the high voltage applied to said electrodes also may be controlled mutually independently. Where only one control implement 66 is provided, this feature offers the advantage that the particular other, empty bin compartment 62 or 64 may serve as storage for parts or documents. Each control implement 66 may be designed to control the compressed air to one or more sprayguns and to control the high electrode voltage of such sprayguns. The expression "control" is to be construed in a general way to apply to switching, adjusting, controlling or regulating.

Each bin compartment 62 and 64 is fitted at a side, namely the cart front side 4 or the cart back side 6, with a respective compartment aperture 68 and 70. In the embodiment modes of FIGS. 1 and 2, the compartment apertures 68 and 70 are situated at the cart front side 4. The operating and display surface of the control implement 66 is also shown on that front side.

In the preferred embodiment mode of the invention, the control implement bin 30 can be suspended from the lateral posts 12 and 14 with the apertures 68 and 70 of the bin compartments 62 and 64 alternatively facing forward or to the rear at the cart's front and back sides respectively.

The preferred embodiment mode of the invention, employs two control implement bins alternatively suspended from the upper end zones of the two lateral posts 12 and 14, one of said bins, namely the bin 30, already described above in relation to FIGS. 1 and 2, and the other bin, namely bin 76, being shown in FIG. 3. This control implement bin 76 of FIG. 3 again contains two mutually adjoining compartments 62 and 64 of which the respective apertures 68 and 70, which admit each a control implement 66, in this instance however face rearward toward the cart's back side. The other control implement bin 76 shown in FIG. 3 is fitted at the cart front side 4 with a forward support shelf 78 to support a stirrer/powder-container 80.

The support shelf 78 is configured substantially high above the base 15. The stirrer/powder-container 80 contains an omitted stirrer to loosen coating powder held in the powder container 80. At its top side, the powder container 80 is fitted with a powder replenishing aperture 82 which can be sealed by a flap 84. One, but preferably two injectors 86 are configured at the lower end of the powder container to pneumatically move powder from the powder container 80 to an omitted spray gun spraycoating objects. A powder container 54, such as a drum from the coating powder manufacturer, may be deposited on the base 15. Coating powder can be taken out of this powder container 54 to replenish the stirrer/powder-container 80.

In the preferred embodiment mode of the invention, the powder spraycoating cart 2 also is fitted at its front, lower end with at least one wheel or a roller. FIGS. 1 and 3 illustratively show two small wheels or rollers 90 and 92 affixed to the base 15 near its front end.

In a special embodiment of the invention, each lateral post 12 and 14 comprises a rail running from the top and rear to the bottom and fore, preferably in the cross-sectional form of a hollow "shape", furthermore a two-leg bent-back bracket 104 preferably also having a cross-sectionally hollow shape. The bent-back bracket 104 comprises a lower, forward extending leg 106 of which the front end zone 106-1 is connected to the lower front end zone 102-1 of the rail 102, preferably being welded to it, and an upward projecting, rear leg 108 of which the upper end zone 108-1 is affixed to the same rail 102 at a site 102-3 away from latter's two end zones 102-1 and 102-2, preferably welding. This affixation site 102-3 of the rail 102 preferably is situated about midway the length of the rail 102 between an upper and a lower third of the rail, or between the half-length point and the lower fourth-length of the rail 102.

Said affixation site 102-3 at the rail 102 is selected in a manner to attain high strength of the lateral posts 12 and 14 so that the powder container 32 respectively 54 on the base 15 be accessible from the left and from the right, and that the lateral posts 12 and 14 shall require only little material and hence shall be economical in weight.

For each lateral post 12 and 14, the bent-back bracket 104 and section of the rail 102 connecting its ends 106-1 and 108-1 subtend a triangle open in the trans-verse cart direction.

The rear wheels 20 and 22 share a common axis of rotation and are each connected to the bent-back bracket 104, said wheels projecting downward and to the rear beyond the angle apex zone 110 subtended by the two legs 104, 106.

In the preferred embodiment mode, the rail 102 always is integral and the bent-back bracket 104 also is integral. Other embodiment modes allow making these components in several parts and connecting them. In still other embodiment modes, the rail and the bent-back bracket connected to it may be made integrally into one part by appropriately bending a bar or a tube.

In the preferred embodiment mode of the invention, the rails 102 are bent inward. In this manner lateral access to the base 15 is enlarged, facilitating thereby depositing and removing a powder container on/from the base 15. Moreover the length of the rear and upward pointing legs 108 of the rails may be shortened thereby. The length of the lower leg 106 of the bent-back brackets 104 depends on the desired size of the powder containers 54 and hence on the required size of the base 15.

The downward-running curvature of the rails 102 may cover the full rail length or be only part of it. In the embodiment shown in the drawings, the rails 102 are curved more at mid-length than at the ends, the upper rail ends, preferably also the lower ones, being straight rather than curved.

In the preferred embodiment mode of the invention, the suspension element 24, 26 of each lateral post 12 and 14 is fitted with an upwardly open hookup slot 24 and a stop surface 26 configured below the hookup slot 24 and pointing to the front side 4. The control implement bins 30 and 76 each are fitted left and right with one laterally protruding upper hookup bolt 120, one of said bolts engaging the hook-up slot 24 of the lateral post 12 and the other the hookup slot 24 of the other lateral post 14. Moreover the control implement bins 30 and 76 on the left and on the right side each are fitted with a stop tang 122, for instance a bolt configured lower than the suspension bolt 120, whereby they may rest against the stop surfaces 26 of the two lateral posts 12 and 14. The two suspension bolts 120 are configured in alignment with each other in the transverse cart direction, correspondingly with the hookup slots 24 which are also mutually aligned. The two stop tangs 122 are aligned in the cart's transverse direction correspondingly to the stop surfaces 26 which are also aligned with each other. The upper suspension bolts 120 are configured excentrically to the center of gravity of the control implement bin 30 respectively 76, the said bins therefore being able to pivot downward by their own weights about the upper suspension bolts 120 until their respective stop protrusions 122 rest against the stop surfaces 26 of the lateral posts 12 and 14.

Preferably the upper suspension bolts 120 shall be threaded to allow tightening the control implement bin 30 respectively 76 against the lateral posts 12 and 14 by means of nuts 124 screwed onto said threaded bolt, preferably using a washer 126. In this process each lateral post 12 respectively 14 is clamped between the control implement bin 30 and 76 and the nut 124 or the washer 126. In this manner the control implement bin 30 respectively 76 increases the rigidity of the powder spraycoating cart 2.

When the lateral posts 12 and 14 of the preferred embodiment mode of the invention each consist of a rail 102 and a bent-back bracket 104, the stop surface 26 bracing the control implement bins 30 respectively 76 shall be constituted by a surface segment of the rails 102.

The hookup slot 24 receiving a bolt 120 of the control implement bin 30 respectively 76 always may be configured in the rail 102. In the preferred embodiment mode, the hookup slot 24 of each lateral post 12 and 14 is constituted by a spacer 130 affixed to the upper end of the particular rail 102, preferably being plugged into it and/or welded or brazed, and running from the upper end of the rail 102 rearward toward the back side 6. The rear end segment of each spacer 130 is connected to one end of the grip bar 136 which as a result connects the two spacers 130 of the two rails 102 to each other. Both on the left cart side 8 and on the right cart side 10, the spacers 120 constitute an extension of the rails 102 and hence also of a segment of the lateral posts 12 and 14, simultaneously also being part of the grip system 16 that includes the grip bar 136. The grip bar 136 may be solid or preferably hollow, for instance a tube.

The control implement bins 30 and 76 preferably are integral parts. The control element bin 76 of FIG. 3 preferably is integral with its support shelf 78.

Preferably the two lateral posts 12 and 14 are identical.

In a particular embodiment mode of the invention, the lateral posts 12 and 14 are subdivided in a central zone situated approximately at half post height into a lower and an upper portion. The two portions may locked to each other and also be detached from each other, being rigidly joined to one another in the locked state and, when unlocked, according to one embodiment mode, can be moved while being collapsed while, in still another embodiment mode, they may be mutually detachable and, where desired, collapsible one on the other. As regards the previously discussed embodiment mode wherein the lateral posts 12 and 14 each comprise a rail 102 and a bent-back bracket 108, the subdividing site at the rails 102 preferably shall be situated above the affixation site 102-3 where the upper end element 108-1 of the rear leg 108 of the bent-back bracket 104 is connected to it.

In illustrative manner, FIG. 7 shows the segment of a rail 102 which, above the aforementioned affixation site 102-3, is subdivided into a lower rail portion 102a and an upper rail portion 102b. The two portions 102a and 102b can be inserted into each other for instance because one of them, illustratively the upper portion 102b, exhibits a cross-sectionally narrower lower segment 202 which is inserted into a tubular end segment 204 of the lower portion 102. This plug-in connection is detachable. To prevent it from coming loose accidentally, it is secured by a securing element 206, for instance a screw system, against loosening, said screw in the assembled condition of the portions 202 and 204 passing through both.

FIG. 8 shows an embodiment variation of the invention wherein the rail 102 again is subdivided into a lower portion 102a and an upper portion 102b. The mutually adjoining end segments 210 and 212 of the two portions 102a and 102b are linked to each other by a connecting rod 208 longitudinally inserted into them and are secured against separation by screws 206 that run through said connecting rod 208 and the mutually opposite end segments 210 and 212 of the two portions 102a and 102b.

FIG. 9 in turn shows a rail 102 subdivided into a lower portion 102a and an upper portion 103b. The end segments 210 and 212 of said portions are connected to each other by a hinge or articulation 220 and thereby are mutually pivotable unless when they are locked by a lock 222. The lock 222 may consist of flanges 224 respectively 226 at the portions 102a and 102b and of at least one threaded bolt 228 connecting said flanges to each other. The direction of collapsing by pivoting may rearward or preferably, as indicated by an arrow 229, forward.

Subdividing the lateral posts 12 and 14 at the approximate half height of said posts in the above discussed manner by subdividing the rails 102 into a lower portion 102a and an upper portion 102b offers the advantage of being able to separate said upper portion from said lower portion, whereby the portions may be superposed on each other (FIGS. 7 and 8) or that they can be moved relative to each other in a collapsed position (from the extended position of FIG. 9 into a collapsed position), wherein they are superposed. In this manner, when the upper portion 102b is removed from the lower portion 102a and is laid on the lower cart section or when collapsed on the lower cart section, the powder spraycoating cart occupies approximately only half the bulk when being shipped/moved or when being packed for shipping. The connection between the lower and the upper portions of the lateral posts 12 and 14 respectively their rails 102 is designed in a manner that the two portions on one hand can be rapidly and simply connected to each other and other hand can be rapidly separated from each other or unlocked to be collapsed. Nevertheless the customer of such a powder spraycoating cart enjoys the advantage that at least the lower cart section can be purchased already fully assembled.

The invention can be implemented in various embodiment modes. The rails 102 and the bent-back brackets 104 may be hollow shapes or pipes/tubes or solid shapes such as angle shapes or U channels. Instead of using a grip bar 136, the spacers 130 each may be designed as handles. Instead of suspending the control implement bin 30 respectively 76 from the lateral posts 12 and 14, it also may be affixed in another manner to the lateral posts, for instance being screwed onto them and/or being affixed by plug-in bolt means.

The invention claimed is:

1. A powder spraycoating cart comprising a front side, a back side, a left side and a right side and at least two wheels, the cart further comprising:

two lateral posts, of which one lateral post is configured on the left side a second lateral post is configured on the right side;

a base connecting lower end segments of the two lateral posts to each other and keeping them spaced apart, the base configured to support a powder container;

a front mounted control implement bin having two sides, the control implement bin affixable to upper end segments of the first and second lateral posts and when in the affixed state, the control implement connects together upper end segments of the two lateral posts and keeps the two lateral posts spaced apart; and a grip system configured at the back side of the powder spraycoating cart;

wherein the control implement bin comprises two compartments adjoining each other, each compartment configured to receive an electronic control implement to program/control a pneumatic feed of coating powder from the powder container to a spray gun; and wherein the base is fitted with a powder container substructure comprising an oblique rest surface configured to have deposited thereon a powder container in a corresponding oblique position in order to allow the coating powder to slip toward a wall of the container;

wherein the upper end segments of the two lateral posts comprise a suspension system that bilaterally suspends the control implement bin, the suspended control implement bin connecting together the two said end segments;

wherein the suspension system of each lateral post comprises an upwardly open hookup slot and the control implement bin at each of its two sides comprises one hookup tang configured to hook into the hookup slots;

wherein the suspension system of each lateral post comprises a forward-pointing stop surface disposed lower than the hookup slot, the control implement bin being hooked by said hookup tangs into the hookup slots of each lateral post and resting on the stop surfaces by means of lateral stop protrusions disposed at a lower level than the hookup tangs; and wherein the hookup tangs are configured in eccentric manner relative to the center of gravity of the control implement bin, whereby said bin is gravitationally pivotable downward about a pivot axis defined by the hook-up tangs and the hook-up slots, until said lateral stop protrusions of said bin rest against the stop surfaces of the lateral posts.

2. Powder spraycoating cart as claimed in claim 1, wherein one side of the bin compartments includes an access aperture configured to receive the control implement.

3. Powder spraycoating cart as claimed in claim 2, wherein the control implement bin is suspended at the lateral posts with the compartment apertures of the bin compartments pointing either forward or rearward.

4. Powder spraycoating cart as claimed in claim 1, wherein the lateral posts each comprise a rail running rearward from above, forward at the bottom, and a two-leg bent-back bracket having a front end segment connected to a lower front end segment of the rail, the lateral posts further comprising an upward pointing, rear leg of which an upper end segment thereof is affixed to the rail at a site which is away from said rail's two end segments.

5. Powder spraycoating cart as claimed in claim 1, wherein the hook-up tangs each include a suspension bolt fitted with a thread matching a threaded nut employed to screw the control implement bin against the lateral posts.

6. Powder spraycoating cart as claimed in claim 1, wherein the stop surfaces of the lateral posts comprise surface segments of the rails.

7. Powder spraycoating cart as claimed in claim 6, wherein the hookup slot is disposed in an extension element affixed to the upper end of the rail and extending from the rail in the rearward direction.

8. Powder spraycoating cart as claimed in claim 4, wherein the rails have a length and over at least part of their length, the rails are arcuate downward and rearward.

9. Powder spraycoating cart as claimed in claim 4, wherein each the lateral posts are subdivided within a middle height zone into a lower portion and an upper portion, in that the two portions can be mutually locked and unlocked, being rigidly joined in their locked state and being mutually displaceable in the unlocked state.

10. Powder spraycoating cart as claimed in claim 9, wherein the subdivision of the rails is situated above the said site, the rear leg being connected to the rail.

11. Powder spraycoating cart as claimed in claim 10, wherein the bent-back bracket is integral.

12. Powder spraycoating cart as claimed in claim 4, wherein each rail is integral and/or that each bent-back bracket is integral.

13. A powder spraycoating cart comprising a front side, a backside, a left side and a right side and at least two wheels, the cart further comprising:

two lateral posts, of which one lateral post is configured on the left side a second lateral post is configured on the right side;

a base connecting lower end segments of the two lateral posts to each other and keeping them spaced apart, the base configured to support a powder container;

a front mounted control implement bin affixable to upper end segments of the first and second lateral posts and when in the affixed state, the control implement connects together upper end segments of the two lateral posts and keeps the two lateral posts spaced apart; and a grip system configured at the back side of the powder spraycoating cart;

wherein the control implement bin comprises two compartments, each compartment having an aperture configured to receive an electronic control implement to program/control a pneumatic feed of coating powder from the powder container to a spray gun; and wherein the control implement bin is fitted at the cart front side with a forward support shelf configured to support a stirrer or powder container;

wherein the upper end segments of the two lateral posts comprise a suspension system that bilaterally suspends the control implement bin, the suspended control implement bin connecting together the two said end segments;

wherein the suspension system of each lateral post comprises an upwardly open hookup slot and the control implement bin at each of its two sides comprises one hookup tang configured to hook into the hookup slots;

wherein the suspension system of each lateral post comprises a forward-pointing stop surface disposed lower than the hookup slot, the control implement bin being hooked by said hookup tangs into the hookup slots of each lateral post and resting on the stop surfaces by means of lateral stop protrusions disposed at a lower level than the hookup tangs; and wherein the hookup tangs are configured in eccentric manner relative to the center of gravity of the control implement bin, whereby said bin is gravitationally pivotable downward about a pivot axis defined by the hook-up tangs and the hook-up slots, until said lateral stop protrusions of said bin rest against the stop surfaces of the lateral posts.

14. A powder spraycoating cart as claimed in claim 13, wherein the control bin is fitted at the backside of the cart, and includes a side thereof pointing to the front side of the cart, the side thereof configured as a support shelf to support an agitator-fitted powder container, said support shelf running forward and being spaced a predetermined height above the base.

15. An assembly comprising a powder spraycoating cart and a powder container, the spraycoating card including a front side, a backside, a left side and a right side and at least two wheels, the cart further comprising:

two lateral posts, of which one lateral post is configured on the left side a second lateral post is configured on the right side;

a base connecting lower end segments of the two lateral posts to each other and keeping them spaced apart, the base configured to support a powder container;

a front mounted control implement bin affixable to upper end segments of the first and second lateral posts and when in the affixed state, the control implement connects together upper end segments of the two lateral posts and keeps the two lateral posts spaced apart; and a grip system configured at the back side of the powder spraycoating cart;

wherein the control implement bin comprises two compartments, each compartment having an aperture configured to receive an electronic control implement to program/control a pneumatic feed of coating powder from the powder container to a spray gun;

wherein the powder container includes a double bottom having an airtight outer bottom and an air permeable inner bottom;

wherein the upper end segments of the two lateral posts comprise a suspension system that bilaterally suspends the control implement bin, the suspended control implement bin connecting together the two said end segments;

wherein the suspension system of each lateral post comprises an upwardly open hookup slot and the control implement bin at each of its two sides comprises one hookup tang configured to hook into the hookup slots;

wherein the suspension system of each lateral post comprises a forward-pointing stop surface disposed lower than the hookup slot, the control implement bin being hooked by said hookup tangs into the hookup slots of each lateral post and resting on the stop surfaces by means of lateral stop protrusions disposed at a lower level than the hookup tangs; and wherein the hookup tangs are configured in eccentric manner relative to the center of gravity of the control implement bin, whereby said bin is gravitationally pivotable downward about a pivot axis defined by the hook-up tangs and the hook-up slots, until said lateral stop protrusions of said bin rest against the stop surfaces of the lateral posts.

16. Powder spraycoating cart as claimed in claim 13, wherein one side of the bin compartments includes an access aperture configured to receive the control implement.

17. Powder spraycoating cart as claimed in claim 15, wherein one side of the bin compartments includes an access aperture configured to receive the control implement.

18. Powder spraycoating cart as claimed in claim 15, wherein the control implement bin is suspended at the lateral posts with the compartment apertures of the bin compartments pointing either forward or rearward.

19. Powder spraycoating cart as claimed in claim 13, wherein the lateral posts each comprise a rail running rearward from above, forward at the bottom, and a two-leg bent-back bracket having a front end segment connected to a lower front end segment of the rail, the lateral posts further comprising an upward pointing, rear leg of which an upper end segment thereof is affixed to the rail at a site which is away from said rail's two end segments.

20. Powder spraycoating cart as claimed in claim 15, wherein the lateral posts each comprise a rail running rearward from above, forward at the bottom, and a two-leg bent-back bracket having a front end segment connected to a lower front end segment of the rail, the lateral posts further comprising an upward pointing, rear leg of which an upper end segment thereof is affixed to the rail at a site which is away from said rail's two end segments.

21. Powder spraycoating cart as claimed in claim 15, wherein the hook-up tangs each include a suspension bolt fitted with a thread matching a threaded nut employed to screw the control implement bin against the lateral posts.

22. Powder spraycoating cart as claimed in claim 20, wherein the stop surfaces of the lateral posts comprise surface segments of the rails.

23. Powder spraycoating cart as claimed in claim 22, wherein the hookup slot is disposed in an extension element affixed to the upper end of the rail and extending from the rail in the rearward direction.

24. Powder spraycoating cart as claimed in claim 19, wherein the rails have a length and over at least part of their length, the rails are arcuate downward and rearward.

25. Powder spraycoating cart as claimed in claim 19, wherein each the lateral posts are subdivided within a middle height zone into a lower portion and an upper portion, in that the two portions can be mutually locked and unlocked, being rigidly joined in their locked state and being mutually displaceable in the unlocked state.

26. Powder spraycoating cart as claimed in claim 25, wherein the subdivision of the rails is situated above the said site, the rear leg being connected to the rail.

27. Powder spraycoating cart as claimed in claim 26, wherein the bent-back bracket is integral.

28. Powder spraycoating cart as claimed in claim 19, wherein each rail is integral and/or that each bent-back bracket is integral.

29. Powder spraycoating cart as claimed in claim 20, wherein the rails have a length and over at least part of their length, the rails are arcuate downward and rearward.

30. Powder spraycoating cart as claimed in claim 20, wherein each the lateral posts are subdivided within a middle height zone into a lower portion and an upper portion, in that the two portions can be mutually locked and unlocked, being rigidly joined in their locked state and being mutually displaceable in the unlocked state.

31. Powder spraycoating cart as claimed in claim 30, wherein the subdivision of the rails is situated above the said site, the rear leg being connected to the rail.

32. Powder spraycoating cart as claimed in claim 31, wherein the bent-back bracket is integral.

33. Powder spraycoating cart as claimed in claim 20, wherein each rail is integral and/or that each bent-back bracket is integral.

* * * * *